United States Patent Office

3,759,883
Patented Sept. 18, 1973

3,759,883
COLD FLOW RESISTANT HOMOGENEOUS COPOLYMERS OF TETRAFLUOROETHYLENE AND CHLOROTRIFLUOROETHYLENE AND PROCESS FOR PREPARING THEM
Max B. Mueller, Morristown, Peter P. Salatiello, Morris Plains, and Herman S. Kaufman, Teaneck Township, N.J., assignors to Allied Chemical Corporation, New York, N.Y.
Filed Nov. 16, 1971, Ser. No. 199,157
Int. Cl. C08f 15/06
U.S. Cl. 260—87.5 A                 4 Claims

ABSTRACT OF THE DISCLOSURE

Granular copolymers of tetrafluoroethylene and between about 0.05 mol percent and about 0.50 mol percent of chlorotrifluoroethylene have superior physical properties and are adapted for molding into objects having enhanced resistance to cold flow under load.

---

This invention relates to moldable copolymers of tetrafluoroethylene and chlorotrifluoroethylene and more particularly, to granular powers of such copolymers, having excellent moldability and high resistance to cold flow under loads, coupled with high tensile and high elongation characteristics, and to a process for preparing them.

Polytetrafluoroethylene possesses a number of unusual properties including chemical inertness, thermal stability, temperature and friction resistance characteristics, which have rendered it useful in the electrical and electronic industries for electrical insulation. Polytetrafluoroethylene is also widely used in the chemical industry for the production of molded gaskets and packing elements and for such other applications as hydraulic sealing components, back-up sealing cups, O-rings, bearings, piston rings and other miscellaneous components.

Valuable as this polytetrafluoroethylene polymer is for such uses, its applications have been limited, especially in the field of gasketing, by its tendency to "cold flow" under the prolonged application of compressive load.

Some alleviation of "cold flow" has been effected by admixture with the polytetrafluoroethylene, of various reinforcing fillers such as powdered metals, glass fibers, asbestos, etc., whereby such cold flow tendencies are reduced.

The use of filled polymers, while satisfactory in certain applications, presents disadvantages in others, especially in certain chemical applications in which the polymeric article is subjected to the action of corrosive chemicals.

Attempts to provide copolymers having the combined properties of cold flow resistance and other necessary moldability properties and end product characteristics, have been largely unsuccesful, and have resulted in products in which one or more of the essential properties for such end uses, particularly gaskets, has been sacrificed. Such copolymers as have been prepared in the past have suffered from low tensile strengths and low percentage elongation values and/or tend to become thermally deteriorated when subjected to the standard sintering temperatures required in the production of molded gaskets.

It is an object of the present invention to provide granular molding powders of copolymers of tetrafluoroethylene and chlorotrifluoroethylene, which, when subjected to conventional gasket manufacturing techniques, produce molded products of greatly enhanced resistance to cold flow as compared to the corresponding homopolymer, without significant deterioration in other essential gasket properties including tensile strength, percent elongation and thermal stability.

It is a further object of our invention to provide homogeneous copolymers of tetrafluoroethylene and chlorotrifluoroethylene having cold flow resistance properties, equal to or better than many filled tetrafluoroethylene homopolymers reinforced with, for example, glass or bronze fillers, together with high tensile and high elongation characteristics.

These and other objects are accomplished according to our invention wherein copolymers of tetrafluoroethylene with unusually small proportions of chlorotrifluoroethylene are provided.

Proportions of chlorotrifluoroethylene in the finished copolymer will range between about 0.05 mol percent and about 0.50 mol percent, preferably between about 0.1 mol percent and 0.50 mol percent chlorotrifluoroethylene (CTFF) and between about 99.95 mol percent and about 99.5 mol percent tetrafluoroethylene (TFE), chlorotrifluoroethylene mol percentages between about 0.20 mol percent and about 0.30 mol percent being especially suitable.

Figure 1:
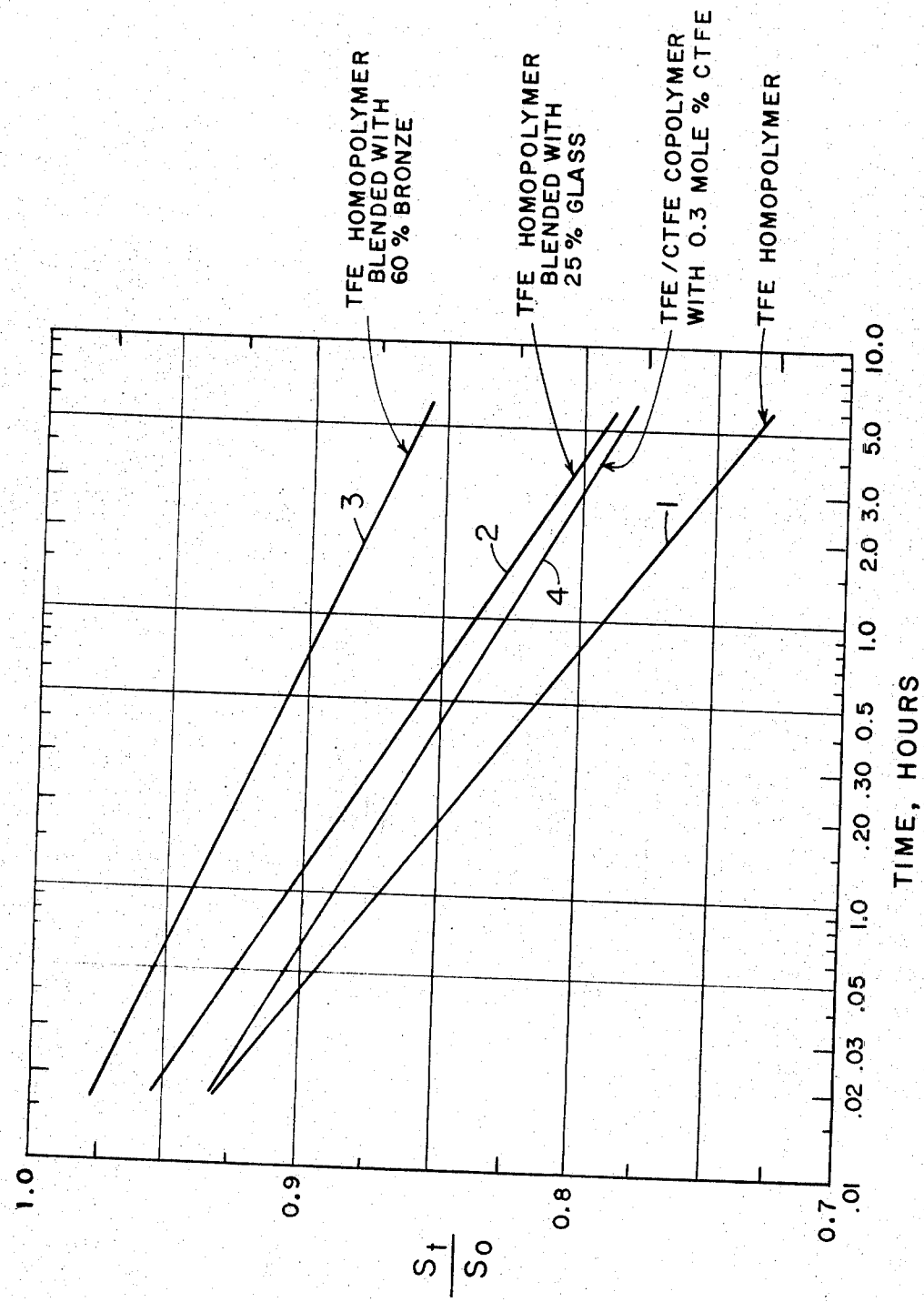
FIG. 1 illustrates the cold flow properties of a specific copolymer of the invention in comparison to filled and unfilled homopolymers.

The term "cold flow" as used herein is defined as an irreversible deformation of the polymeric object under load. This cold flow tendency is one of the major faults of polytetrafluoroethylene (PTFE) grades currently available commercially. Thus, in order to utilize the valuable properties of PTFE such as thermal stability, chemical inertness, and low friction characteristics, fabricators of PTFE in many cases must add inert fillers such as glass, bronze and asbestos to the PTFE molding powders to produce parts relatively resistant to cold flow.

It is well known that polytetrafluoroethylene powders are available as products of two general kinds. A first group (1) comprises polytetrafluoroethylene granular powders having relatively large particle size usually in excess of about 20 microns, usually with average particle size between about 25 microns and about 600 microns, providing a total surface per gram in the range of 1 to 4 square meters. These granular polymers are obtained by procedures which comprise polymerizing tetrafluoroethylene in contact with an aqueous medium containing a free radical initiator to obtain a slurry of polymer particles in nonwater-wet form. A second type (2) of polytetrafluoroethylene, is produced in the form of powders of colloidal particle size, in the range of about 0.05 to 0.50 micron and having a total surface area per gram in the range of 9 to 12 square meters. This second type of polymer is obtained by polymerizing tetrafluoroethylene in aqueous medium containing a free radical initiator and a telogenically inactive dispersing agent to obtain an aqueous colloidal dispersion of polymer particles.

The copolymers of our invention belong to the first class of polymers, namely the granular powders. These are well adapted for compression molding purposes wherein shapes are formed by producing compression molded preforms which are then free-sintered at temperatures on the order of 716° F. (380° C.). The fine dispersion powders of the second type, i.e., the so-called "paste" polymers, on the other hand, are not suitable for general molding or compression molding as they tend to crack when preformed and free-sintered in attempts to make massive articles, and as they exhibit poor powder flow properties which render them difficult to process in automatic molding machines.

In order to be useful in the production of molded products such as gaskets, the first group of polymers referred to above, namely the granular polymeric materials, must be capable of providing, when molded by conventional techniques such as compression molding, a stable, shaped article or "preform" which will maintain its shape and dimensions and will resist cracking and deformation upon heating ("sintering") at the standard sintering temperature of 380° C. (716° F.) without the support of the mold, i.e., upon "free sintering." Moreover, the preform should not exhibit any appreciable thermal degradation as a result of exposure to such temperatures.

The resulting sintered objects must have high tensile strengths, and preferably high elongation values, as specifications for polytetrafluoroethylene often specify minimum tensiles and elongations. Thus, for example, according to the Society of Automotive Engineers Aerospace Material Specifications (AMS 3652A) of 1966, the grade of polytetrafluoroethylene for application such as for gaskets and other parts where high mechanical or electrical characteristics are not required should have a tensile strength of at least 1,500 and elongation of at least 100 (ASTM D–638). For the so-called "premium grades," the corresponding SAE specification (AMS 3661 of 3–15–66) requires tensiles of at least 3,600, elongations of at least 270 for thin films up to 0.005 inch thickness; and tensiles of at least 4,000, elongations of at least 300 for films 0.005 inch and over.

The chlorotrifluoroethylene copolymers of our invention retain substantially undeteriorated all the thermal, tensile, elongation and good processing characteristics of the polytetrafluoroethylene homopolymers, and in addition, provide greatly enhanced resistance to cold flow over those of the homopolymers.

The chlorotrifluoroethylene copolymers provide products having enhanced cold flow over the homopolymers, together with tensile strengths generally in excess of at least 1,500, typically 1,500 to 4,000.

As a method of evaluating cold flow resistance of our polymers, we calculate a "cold flow index" derived by testing the various polymers according to a modification of ASTM test method F–38–T for measuring stress relaxation of gasket material. In preparing the specimen gaskets for testing for tensile, elongation and stress-strain properties, molded preforms are first prepared by pressing the polymeric granular molding powder into circular discs .0625 inch thick by 2⅛ inches in diameter, under a pressure of 3,200 p.s.i. for 3 minutes. The discs are removed from the mold and "free sintered" at the standard temperature of 716° F. or at other specified temperatures, if desired, for a standard period, for example 2 hours. After cooling to room temperature (ca. 20° C.) at a rate of 2.2° F. per minute, one gasket sample, 2.00 inches outside diameter (O.D.), and 1.625 inches inside diameter (I.D.), is cut out from each disc providing a test specimen having one square inch of area.

For determining the cold flow properties, the test specimens are placed between two peripherally open platens and compressed under a load of 2,000 p.s.i.g. by means of a strain bolt equipped with internal strain gauges designed to compensate for torque and temperature changes. The test sample is maintained under the constant strain produced by the initial compression, and while thus maintained, the decline or relaxation of stress with time is measured on a conventional strain gauge. From the data thus obtained a curve is drawn by plotting the ratio of the stress at a given time $(S_t)$ to the initial stress $(S_o)$ against log of elapsed time under compression. The slope of the resulting curve is a measure of the tendency of the sample to deform irreversibly under pressure, known as cold flow. The steeper the curve, the greater the cold flow. Thus a zero slope, i.e. a horizontal curve, would indicate zero cold flow. The numerical values used herein to designate "cold flow index" (CFI) represent 200 times the differences between the ratios $S_t/S_o$ at 0.1 hour after initial application of the 2,000 p.s.i.g. pressure on the sample and at 1 hour after initial application of such pressure, can be written.

$$CFI = \left(\frac{S_t (0.1 \text{ hour})}{S_o} - \frac{S_t (1.0 \text{ hour})}{S_o}\right)(200)$$

Referring to the drawings, the curve in FIG. 1 depicts compressive stress relaxation $S_t/S_o$ measured as described above using ⅟₁₆ inch gaskets with initial stress of 2,000 p.s.i.g., over a period of 1 minute to 10 hours (readings being taken at intervals of 1, 2, 3, 6, 15, 30 and 60 minutes, and hourly thereafter), of copolymers of tetrafluoroethylene and 0.3 mol percent of hexafluoropropene in comparison with similar values for a commercial tetrafluoroethylene homopolymer alone and filled respectively with 25% glass and 60% bronze.

Thus, curve 1 in FIG. 1 illustrates the cold flow properties of a typical polytetrafluoroethylene homopolymer having a cold flow index of 16.1. Curve 2 illustrates the cold flow properties of the standard TFE homopolymer of curve 1, blended with 25% glass fibers and having a CFI of 13.3. Curve 3 illustrates the cold flow properties of the same standard TFE homopolymer blended with 60% bronze powder and having a CFI of 9.7. Curve 4 illustrates the cold flow properties of a copolymer of 0.3 mol percent chlorotrifluoroethylene and 99.7 mol percent of tetrafluoroethylene in accordance with the present invention having a cold flow index of 12.0.

Figure 2:
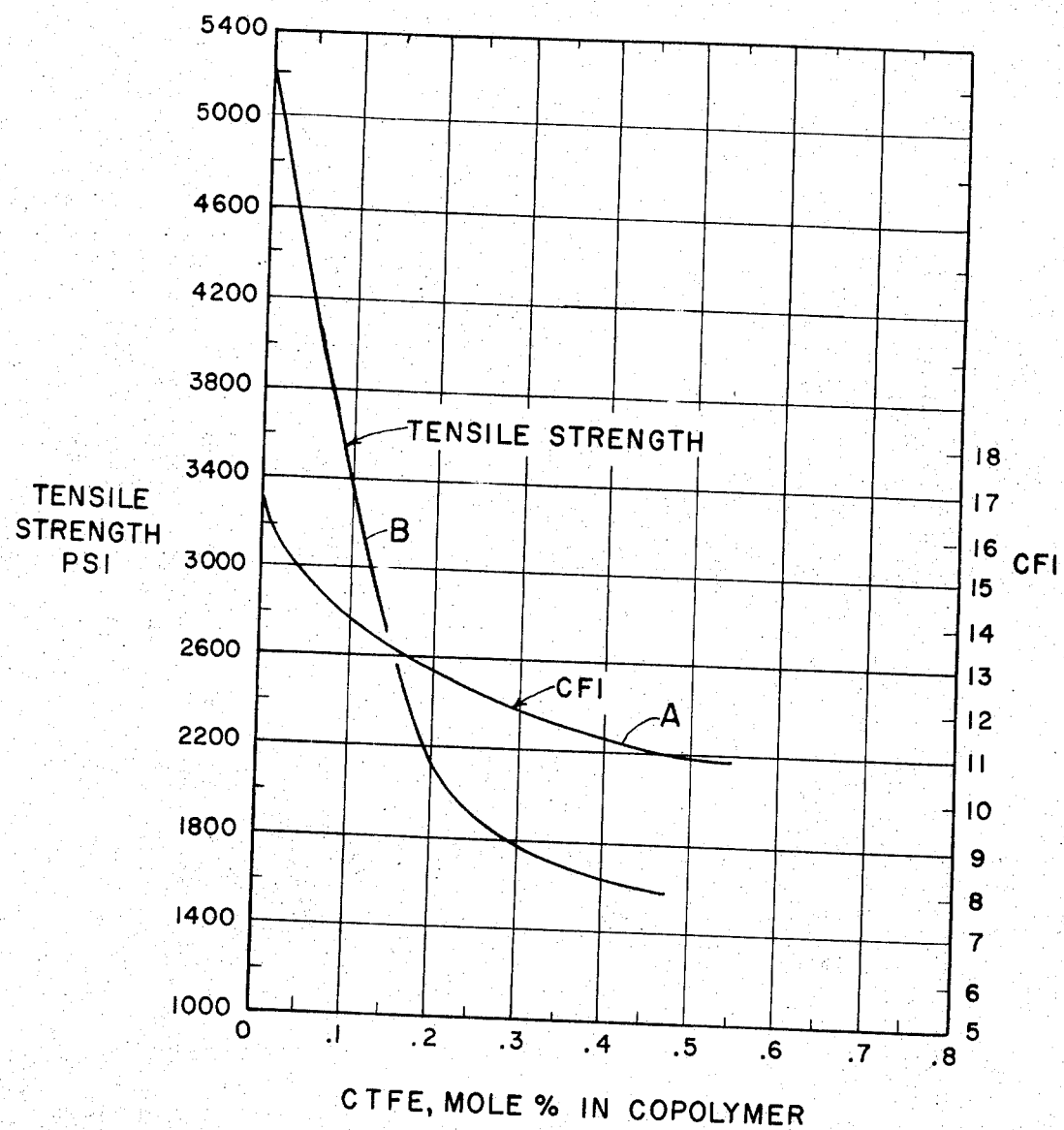
FIG. 2 shows two curves illustrating the variations in cold flow properties and tensile strength in homogeneous copolymers of tetrafluoroethylene and chlorotrifluoroethylene containing mol percentages of chlorotrifluoroethylene ranging from 0.05 mol percent to 0.5 mol percent.

In FIG. 2, curve A illustrates the variation in cold flow index of copolymers of chlorotrifluoroethylene and tetrafluoroethylene containing mol percentages of chlorotrifluoroethylene varying between 0.05 mol percent and 0.6 mol percent. Curve B illustrates the concomitant variation in tensile strengths of copolymers having the above compositions.

Copolymers of our invention can be prepared using conventional polymerization techniques of the character generally employed in the production of polytetrafluoroethylene granular molding powders. Such polymerization techniques are well known to those skilled in the art. An exemplary description thereof may, for example, be found in U.S. Pat. 2,393,967 to Brubaker. Briefly, these techniques involve copolymerizing the monomers in a stirred aqueous medium under superatmospheric pressure at temperatures in the range of 0° to 100° C., using water-soluble inorganic peroxy compounds as free radical initiators in amount ranging from 0.01 to 1 mol percent, based on the monomer employed. When proceeding in accordance to those techniques, the tetrafluoroethylene and chlorotrifluoroethylene monomers are ordinarily charged initially to the polymerization vessel in proportion of 0.025 mol percent to about 0.3 mol percent of chlorotrifluoroethylene. If desired, reaction pressure can be maintained constant throughout polymerization reaction by addition as the reaction proceeds of more tetrafluoroethylene or of the same monomer mix initially charged to the reactor. Upon completion of the reaction, the polymer product is separated from the medium wherein it is prepared, followed by washing and drying. Tetrafluoroethylene/chlorotrifluoroethylene copolymer thus prepared containing between about 99.95 mol percent and about 99.50 mol percent of tetrafluoroethylene and between about 0.05 mol percent and about 0.50 mol percent of chlorotrifluoroethylene, after molding and sintering provides a tensile strength of at least about 1,500 p.s.i. and a cold flow index value at least about 2 units less than that of the corresponding homopolymer of tetrafluoroethylene.

The copolymer product obtained as above described is non-homogeneous, that is to say it is not of identical composition throughout, because, due to different effective reactivity ratios of the monomers in aqueous suspension polymerization systems, the chlorotrifluoroethylene being more reactive than the tetrafluoroethylene, the mol ratio of the monomers in the free vapor space of the reactor constantly changes as the reaction proceeds, resulting in formation of copolymer containing varying amounts of comonomer. Thus, as polymerization reaction is initiated using a tetrafluoroethylene/chlorotrifluoroethylene blend of certain mol ratio, there is formed initially a copolymer which is relative to the monomer blend, rich in chlorotrifluoroethylene, and correspondingly lean in tetrafluoroethylene because the former is more reactive. As the reaction proceeds, the monomer blend is preferentially depleted of chlorotrifluoroethylene, and it becomes correspondingly richer in tetrafluoroethylene. Accordingly, as the reaction proceeds, incremental portions of the copolymer product are becoming gradually richer in tetrafluoroethylene.

In a preferred embodiment of the invention copolymers of tetrafluoroethylene and chlorotrifluoroethylene of homogeneous composition throughout consisting of between about 99.95 mol percent and about 99.50 mol percent of tetrafluoroethylene and between about 0.5 mol percent and 0.50 mol percent of chlorotrifluoroethylene are provided which have, as compared to the non-homogeneous copolymers above described, improved tensile strength and improved cold flow, but specifically improved heat stability at 716° F., the standard sintering temperature for polytetrafluoroethylene. The homogeneous tetrafluoroethylene/chlorotrifluoroethylene copolymers of the present invention are obtained by polymerizing the monomers, as above described, but under conditions such that there is maintained in the free vapor space of the reactor throughout the polymerization a constant, predetermined ratio of tetrafluoroethylene to chlorotrifluoroethylene.

The preferred homogeneous copolymers of our invention can be prepared by a modification of the conventional polymerization techniques of the character generally employed in the production of polytetrafluoroethylene granular molding powders as above described, but controlled to insure production of homogeneous copolymers the tetrafluoroethylene and chlorotrifluoroethylene monomers in the reactor free vapor space in constant, predetermined porportions. This is accomplished by providing in the polymerization system an initial mixture of gaseous tetrafluoroethylene and gaseous chlorotrifluoroethylene having proportions in the range between about 0.025 mol percent and about 0.3 mol percent chlorotrifluoroethylene, the balance tetrafluoroethylene, thereafter feeding to said system additional quantities of at least one of the gaseous comonomers, while concomitantly controlling the ratio of the partial pressure of chlorotrifluoroethylene to the sum of the partial pressures of chlorotrifluoroethylene and tetrafluoroethylene, to provide a constant, predetermined ratio of chlorotrifluoroethylene to tetrafluoroethylene within the above range of proportions. In general, a gaseous blend of tetrafluoroethylene and comonomer, chlorotrifluoroethylene, is charged to a reaction vessel containing deionized water, the components being introduced in such proportions as to provide the predetermined ratio of tetrafluoroethylene to chlorotrifluoroethylene vapors in the reactor required to produce homogeneous copolymers of the desired composition. This constant composition can be provided by first introducing an initial charge of tetrafluoroethylene and chlorotrifluoroethylene into the reactor in the proportions required to produce copolymers of the desired composition, and then maintaining this composition constant by feeding a mixture of monomer and comonomer in the same molar proportions as those in the polymer to be produced.

The components are introduced into the reactor in amounts to produce an initial ratio of comonomer chlorotrifluoroethylene (A) to tetrafluoroethylene (B) dictated by the effective reactivity ratios $r_1$ and $r_2$ of the comonomers chlorotrifluoroethylene and tetrafluoroethylene respectively in aqueous suspension polymerization systems, and the mol ratios of the two components desired in the copolymer ($a$ and $b$), according to the equation below:

$$\frac{a}{b} = \frac{r_1 \frac{A}{B} + 1}{r_2 \frac{B}{A} + 1}$$

The above equation states that in a polymerizing system containing A mol fraction of chlorotrifluoroethylene and B mol fraction of tetrafluoroethylene, the composition of an incremental polymer product $\Delta P$, will consist of "$a$" mol fraction of chlorotrifluoroethylene and "$b$" mol fraction of tetrafluoroethylene.

Figure 3:
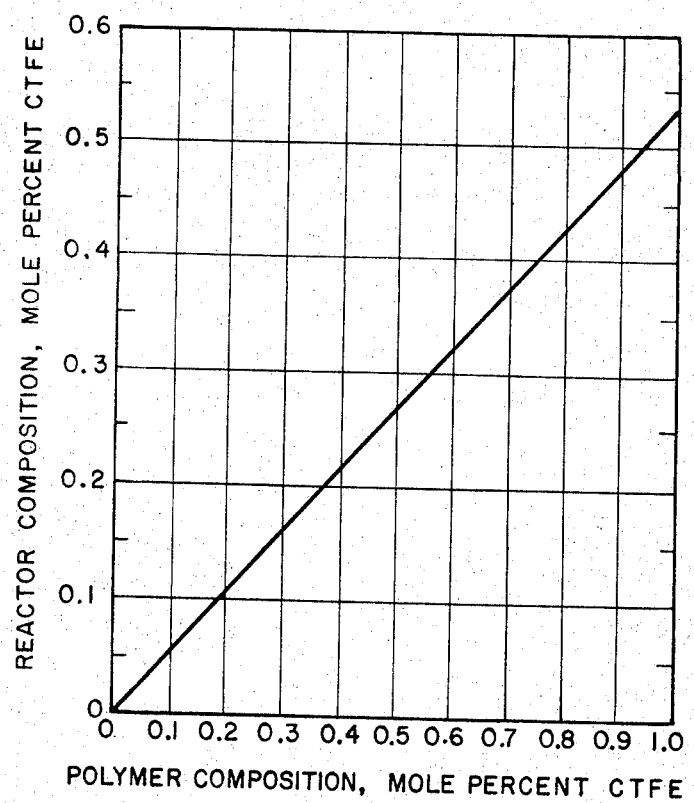
FIG. 3 shows a curve illustrating typical variations in steady state compositions of the reacting mass and the steady state feed composition of comonomers necessary to produce homogeneous granular copolymers of tetrafluoroethylene and chlorotrifluoroethylene of final compositions between zero CTFE (100% TFE) and 1.00% CTFE and 99.00% TFE in a typical aqueous suspension polymerization system.

In a typical aqueous suspension polymerization system for making homogeneous copolymer of chlorotrifluoroethylene (A) and tetrafluoroethylene (B) in accordance with the present invention we have determined $r_1$ as 16.7, and $r_2$ as 0.56. These values for $r_1$ and $r_2$ were derived from the experimentally determined curve in FIG. 3 illustrating typical variations in steady state compositions of the reacting mass and the steady state feed composition of comonomers necessary to obtain homogeneous copolymers of the present invention. We have, however, found that effective reactivity ratio $r_1$ and $r_2$ in aqueous suspension polymerization systems for making the copolymers of the present invention are dependent to significant extent on monomer mass transfer conditions which are determined by factors such as polymerization temperatures, reactor pressures, reactor volume, and agitation. Thus, while FIG. 3 and the values provided herein for $r_1$ and $r_2$, serve as a useful guide in making homogeneous copolymers of the present invention, it should be realized that, depending upon specific polymerization conditions and particular polymerization vessel employed, they are subject to some variation. Exact values for any particular system and set of polymerization conditions are, however, readily determinable using minimum amount of routine experimentation based on the data provided herein.

The desired ratio of A to B in the polymerizing system, when once established, is readily maintained by feeding to the system a mixture of the two monomers in the precise proportion desired in the finished product and produces a product of homogeneous composition. This follows since when monomer equivalent in amount to the incremental polymer $\Delta P$ is replaced at a monomer ratio $a/b$, the polymerization system will maintain a steady state composition corresponding to $A/B$, and each successive incremental polymer product will contain copolymer units in the ratio of $a/b$ and such a copolymer will have a constant composition throughout and hence will be a homogeneous copolymer.

Any deviation in the relative proportions of comonomers in the polymerizing system whether caused by a variation in the proportions of comonomers in the feed or otherwise will cause the composition of the polymer product to vary and will thus produce a non-homogeneous product.

When proceeding in accordance with the preferred embodiment of the process of the present invention, there will be required as initial reactor charges, chlorotrifluoroethylene concentrations between about 0.025 mol percent and about 0.3 mol percent, depending on the final mol percent of copolymer desired. The total fluorocarbon partial pressures of between about 15 and 500 p.s.i.a. are suitable, i.e. tetrafluoroethylene partial pressures between about 14.9 and about 499 p.s.i.a. and chlorotrifluoroethylene partial pressures between about 0.005 and about 1.5 p.s.i.a. In carrying out the polymerization, the reaction vessel contents are heated to a temperature in the range between about 30° C. and about 100° C. and a small quantity of a free radical initiator such as an alkali metal persulfate catalyst is added thereto to initiate the reaction. Tetrafluoroethylene and chlorotrifluoroethylene in the desired proportions are charged to the reactor to the indicated partial pressure. The reaction pressure is maintained by continuously charging the reaction vessel with a gaseous tetrafluoroethylene/chlorotrifluoroethylene blend of the desired final proportions, namely a blend of the tetrafluoroethylene and chlorotrifluoroethylene of the relative proportions desired in the final copolymer, namely containing 0.05 mol percent to 0.50 mol percent chlorotrifluoroethylene, and 99.95 mol percent to 99.50 mol percent tetrafluoroethylene.

At the end of the polymerization period of, for example, 1 to 24 hours, the feed of the gaseous monomer or monomer-comonomer blend into the polymerization zone is discontinued and the reaction vessel is vented. The granular product copolymer is washed with water, dried at temperatures below about 150° C., e.g. 100° C., and recovered as coarse granular agglomerates which can be deagglomerated by milling to granular powders having average particle sizes in the range of about 20 microns to about 600 microns or higher. The coplymer product is homogenous throughout and has a composition dependent on the constant gas phase monomer composition maintained during the polymerization reaction. The copolymers exhibit substantially undiminished the characteristic thermal, chemical, mechanical and electrical properties of the tetrafluoroethylene homopolymer and in addition, have markedly enhanced resistance to cold flow.

The copolymers of our invention can be employed without fillers to provide unfilled materials having cold flow resistances significantly superior to that of the tetrafluoroethylene homopolymer and often equal to or better than prior art filled polymers. In terms of cold flow index (CFI) as defined, this superiority usually provides a CFI value in the copolymer of at least about 2 units less than that of the corresponding tetrafluoroethylene homopolymer; frequently as much as 5 or more CFI units less than the homopolymer. Thus, a tetrafluoroethylene homopolymer with a CFI index value of 16 can be modified to have a CFI of no greater than about 14, and often as low as 11 or less by copolymerization with the small proportions of the comonomer of our invention.

Our copolymers can also be employed in admixture with conventional thermally stable, particulate fillers such as glass and asbestos fibers and carbon powder, forming compositions which provide molded products having cold flow resistances superior to the prior art filled products. When fillers are used, they can be mixed with our copolymers in conventional proportions of between about 5 percent and about 60 percent by weight of the total composition. In the case of glass, carbon and asbestos fillers, proportions between about 5 percent and about 40 percent, preferably between about 15 percent and about 25 percent are suitable. The mixtures are blended by milling and are molded into shapes such as gaskets by pressing and sintering using substantially the technique described hereinabove for the preparation of test specimens.

The fact that chlorotrifluoroethylene, used in fractional mol percentages as comonomer in the polymerization of tetrafluoroethylene, produces such significant enhancement in resistance to cold flow of the resulting copolymers without substantial damage to other desirable properties of the homopolymer, is extremely surprising, particularly in view of the fact that a great many other polymerizable unsaturated fluorinated hydrocarbons fail to produce a similar result.

Thus, the fluoroalkenes listed in Tables IA and IB below, when copolymerized with tetrafluoroethylene in the manner set forth herein, either showed no improvement in cold flow resistance or developed thermal instability at the required standard sintering temperature of about 716° F. (380° C.) and thus failed to produce copolymers commercially usable as gasket material because of this damage to the useful properties of the homopolymer. The thermal instability of these copolymers is demonstrated by either curling of the gaskets or gassing and blistering of the discs. Table IA lists those copolymers which either failed to provide appreciably reduced cold flow over the corresponding homopolymer or developed unacceptably low tensile strengths. Table IB lists those comonomers which produced thermally unstable copolymers which decomposed at the sintering temperature of 716° F. and which were therefore useless for molding at these temperatures. Their cold flow indices could therefore not be measured.

TABLE IA.—COPOLYMERS OF TFE WHICH SHOWED LITTLE OR NO IMPROVEMENT IN COLD FLOW RESISTANCE (CFI) [1] OR HAD LOW TENSILES

| Comonomer | Mol percent comonomer | Specific gravity | CFI | Tensile, p.s.i. |
|---|---|---|---|---|
| None (typical TFE homopolymer) | None | 2.165 | 16 | 5,000 |
| $F_3C-N=O$ | 0.2 | 2.265 | 14.1 | 1,800 |
| $F_3C-N=O$ | 0.1 | 2.256 | 14.0 | 1,800 |
| $F_2C=CHF$ | 0.12 | 2.272 | 16.4 | (2) |
| $F_2C=CF-SF_5$ | 0.20 | 2.272 | 15.8 | (2) |
| $F_2C=CH_2$ | 0.25 | 2.286 | [3] 13.6 | (2) |
| $F_2\begin{array}{c}\text{—F}\\ \text{—}\\ \text{—F}\end{array}$ | 0.20 | 2.261 | 12.9 | 900 |

[1] All samples sintered at 716° F. for 2 hours.
[2] Not tested.
[3] This sample was sintered in a nitrogen atmosphere with oxygen excluded.

TABLE IB

Copolymers of TFE which exhibited thermal instability

| Comonomer: | Mol percent comonomer |
|---|---|
| $F_2C=CCl_2$ | 0.20 |
| $F_2C=CHF$ | 0.20 |
| $FHC=CH_2$ | 0.20 |
| $F_2C=CH_2$ | 0.185 |
| $H_2C=CHCH_3$ | 0.30 |
| $H_2C=C(CH_3)_2$ | 0.13 |
| $H_2C=CHCl$ | 0.14 |
| $F_2C=C(CH_3)OCH_3$ | 0.20 |

Remarks.—All samples decomposed by curling and blistering at standard sintering temperature of 716° F. for 2 hours.

In Table II below are shown the relative thermal stabilities of homogeneous tetrafluoroethylene/chlorotrifluoroethylene copolymers of varying percentages chlorotrifluoroethylene.

TABLE II

| Chlorotrifluoroethylene, mol percent | CFI | Thermal stability at 716° F. |
|---|---|---|
| 0.2 | 12.5 | Stable. |
| 0.29 | 12.0 | Do. |
| 0.33 | 12.0 | Do. |
| 0.37 | 11.4 | Do. |
| 0.44 | 11.1 | Do. |
| 0.5 | 10.9 | Slightly decomposed. |
| 0.5 | | Decomposed |

The thermal stability tests recorded in Table II above were carried out by forming molded gasket preforms by compressing at 3,200 p.s.i. and subjecting the preforms to free sintering at 716° F. and visually observing the effect on the appearance of the sintered disc. "Decomposed" samples exhibited appreciable blistering and curling to an extent rendering them unsatisfactory for gasket use. "Slightly decomposed" sample exhibited only slight blistering and curling, to an extent insufficient to render it unsuitable for gaskets. "Stable" samples exhibited no visible deformation or blistering. It is apparent from the above Table II that tetrafluoroethylene/chlorotrifluoroethylene appreciably in excess of 0.50 mol percent are unsuitable for gasket molding purposes because of their thermal instability.

The following specific examples further illustrate our invention. Parts are by weight except as otherwise noted.

EXAMPLE 1

Preparation of homogeneous copolymer containing 99.8 mol percent of tetrafluoroethylene and 0.2 mol percent of chlorotrifluoroethylene A 30-gallon, glass-lined, high pressure reactor is charged with 21 gallons of deionized water and adjusted to pH 2.5 with 10 percent $H_2SO_4$. The reactor is evacuated, then charged with nitrogen until a slight positive pressure is reached. The reactor is then agitated and heated at 65° C. Then the nitrogen is evacuated and a solution consisting of 5.0 grams of potassium persulfate in 1 liter of deionized water is forced into the reactor. The vessel is then charged with a mixture of tetrafluoroethylene and chlorotrifluoroethylene having a composition of 0.11 mol percent chlorotrifluoroethylene to a partial pressure of 100 p.s.i.a. The reaction begins after a 5 minute induction period and the reactor pressure is maintained at 100 p.s.i.a. partial pressure by the continuous addition through a pressure regulating valve, of a mixture of tetrafluoroethylene and chlorotrifluoroethylene having a composition of 0.2 mol percent of the chlorotrifluoroethylene. After about one hour the reactor is quickly cooled to about 20° C. and the monomer mixture in the reactor analyzed by gas chromatography. The analysis shows that the composition of the monomer mixture in the reactor is essentially unchanged during the course of the copolymerization. There is thus obtained a white, granular material at the rate of 1.1 lbs./hr./gal. which is a copolymer homogeneously composed of 0.2 mol percent chlorotrifluoroethylene and 99.8 mol percent of tetrafluoroethylene as verified by infrared spectrogram. The copolymer possesses physical properties including cold flow resistance, as shown in FIGS. 1 and 2. Its tensile creep resistance is far better than PTFE or PTFE filled compounds.

EXAMPLE 2

Into a reactor having a total volume of 44 gallons (166.5 liters) equipped with a crowfoot agitator, is charged 20.5 gallons of deionized water. The vessel is then evacuated and purged with nitrogen. The charge is then heated to 65° C. with agitation under a blanket of nitrogen. Then 5 grams of potassium persulfate in 0.5 gallon of water was added to the charge (making a total of 21 gallons [or 79.42 kg.], of water, leaving a free volume of 87.0 liters). The reactor is then evacuated. Gaseous chlorotrifluoroethylene is then introduced in the amount of 6.5 grams followed by introduction of nitrogen to a pressure of 65 p.s.i.a. Then gaseous tetrafluoroethylene is introduced in sufficient amount to bring the total reactor pressure to 164.7 p.s.i.a. Thus, of the total pressure of 164.7 p.s.i.a., 99.7 p.s.i.a. represents the partial pressure of tetrafluoroethylene; 0.3 p.s.i.a. represents the partial pressure of chlorotrifluoroethylene and 64.7 p.s.i.a. represents nitrogen pressure. The agitator is then started and polymerization is begun. As soon as a 10 p.s.i.a. pressure drop is observed, indicating initiation of the polymerization (a period of about 6 minutes), introduction of gaseous mixture of tetrafluoroethylene and chlorotrifluoroethylene is commenced at a rate sufficient to provide, and maintain constant, reactor pressure of 164.7 p.s.i.a., the pressure required to provide the mol ratio of .25 mol percent of chlorotrifluoroethylene and 99.75 mol percent of tetrafluoroethylene necessary to produce a copolymer containing .45 mol percent chlorotrifluoroethylene. This mixture must consist of 0.45 mol percent CTFE and 99.55 mol percent TFE.

The composition of the two gaseous monomers in the free space of the reactor is monitored during the course of the reaction by removing gas samples from the reactor after completion of the production of each successive 10 pounds of copolymer product, and analyzing the gas chromatographically for chlorotrifluoroethylene content.

Upon conclusion of the polymerization the reactor is vented and the granular polymer, which is distributed in small particles throughout the liquid phase, is collected by filtration.

Non-homogeneous chlorotrifluoroethylene/tetrafluoroethylene copolymers containing between 0.05 and 0.5 mol percent of chlorotrifluoroethylene as may, e.g., be obtained by copolymerizing chlorotrifluoroethylene with tetrafluoroethylene in conventional manner by feeding all of the chlorotrifluoroethylene comonomer as an initial charge under conditions such that the partial pressure of chlorotrifluoroethylene to the sum of the partial pressures of chlorotrifluoroethylene and tetrafluoroethylene is gradually reduced as the polymerization proceeds critically differ from the homogeneous chlorotrifluoroethylene/tetrafluoroethylene copolymers in accordance with the present invention of equal chlorotrifluoroethylene comonomer content in that they have a cold flow index which is at least 1 unit higher than that of the corresponding homogeneous copolymer, and further in that they are not thermally stable at 716° F. sintering temperature for 2 hours, by the method described, supra. These non-homogenous copolymers, however, do have cold flow indices which are only about ½ to 1 unit higher than those of the corresponding homogeneous copolymers, but which, in any event, are at least about 2 units less than that of the corresponding homopolymer of tetrafluoroethylene. Also, non-homogeneous copolymers of the present invention, though they have, on molding and sintering, slightly lower tensile strength than the corresponding homogeneous copolymer of the present invention, they have in any event, tensile strength of at least about 1,500 p.s.i.

While the foregoing describes the preferred embodiment of our invention, it will be understood that departures can be made therefrom within the scope of the specification and claims.

We claim:

1. A tetrafluoroethylene copolymer granular molding powder having a particle size of 25 to 600 microns, said copolymer consisting of between about 99.95 mol percent and about 99.50 mol percent of tetrafluoroethylene and between about 0.05 mol percent and about 0.50 mol percent of chorotrifluoroethylene, said molding powder providing, after molding and sintering, a tensile strength of at least about 1,500 p.s.i. and a cold flow index value at least about 2 units less than that of the corresponding homopolymer of tetrafluoroethylene.

2. The copolymer granular molding powder of claim 1 wherein the chlorotrifluoroethylene is present in amount between about 0.20 mol percent and 0.30 mol percent.

3. A homogeneous tetrafluoroethylene copolymer granular molding powder having a particle size of 25 to 600 microns, said copolymer consisting of between 99.95 mol percent and about 99.50 mol percent of tetrafluoroethylene and between 0.05 mol percent and about 0.50 mol percent of chlorotrifluoroethylene, said molding powder being thermally stable on sintering for two hours at 716° F., said molding powder providing, after molding and sintering a tensile strength of at least about 1,500 p.s.i. and a cold flow index value at least about 2 units less than that of the corresponding homopolymer of tetrafluoroethylene.

4. The homogeneous tetrafluoroethylene copolymer granular molding powder according to claim 3 wherein the chlorotrifluoroethylene is present in an amount between about 0.20 mol percent and 0.30 mol percent.

References Cited
UNITED STATES PATENTS

| | | | |
|---|---|---|---|
| 2,393,967 | 2/1946 | Brubaiter | 260—80 |
| 3,009,892 | 11/1961 | Duddington et al. | 260—29.6 |
| 3,413,276 | 11/1968 | Hoashi et al. | 260—92.1 |
| 3,655,611 | 4/1972 | Mueller et al. | 260—41 |

JAMES A. SEIDLECK, Primary Examiner

S. M. LEVIN, Assistant Examiner

U.S. Cl. X.R.

260—41 A, 41 AG, 41 B, 41 C, 92.1 R